United States Patent
Pearson et al.

(10) Patent No.: US 9,015,597 B2
(45) Date of Patent: Apr. 21, 2015

(54) GENERATION AND IMPLEMENTATION OF A SOCIAL UTILITY GRID

(75) Inventors: Larry B. Pearson, San Antonio, TX (US); Steven M. Belz, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 638 days.

(21) Appl. No.: 12/533,523

(22) Filed: Jul. 31, 2009

(65) Prior Publication Data

US 2011/0029887 A1 Feb. 3, 2011

(51) Int. Cl.
G06F 3/00 (2006.01)
G06Q 10/10 (2012.01)

(52) U.S. Cl.
CPC .................................... G06Q 10/10 (2013.01)

(58) Field of Classification Search
USPC ........................................................ 715/751
See application file for complete search history.

(56) References Cited

U.S. PATENT DOCUMENTS

| | | | |
|---|---|---|---|
| 7,716,140 B1* | 5/2010 | Nielsen et al. ................ 705/319 |
| 7,844,671 B1* | 11/2010 | Lawler et al. ................ 709/206 |
| 7,949,611 B1* | 5/2011 | Nielsen et al. ................ 705/319 |
| 8,055,675 B2* | 11/2011 | Higgins et al. ................ 707/769 |
| 2004/0122855 A1* | 6/2004 | Ruvolo et al. ............. 707/104.1 |
| 2004/0128322 A1* | 7/2004 | Nagy ........................ 707/104.1 |
| 2006/0031203 A1* | 2/2006 | Rosenbaum et al. ............. 707/3 |
| 2006/0088038 A1* | 4/2006 | Ravula et al. ................ 370/397 |
| 2008/0104517 A1* | 5/2008 | Horvitz ........................ 715/733 |
| 2009/0005040 A1* | 1/2009 | Bourne ...................... 455/435.1 |
| 2009/0036148 A1* | 2/2009 | Yach ............................ 455/457 |
| 2009/0049149 A1* | 2/2009 | Cheah .......................... 709/206 |
| 2009/0054043 A1* | 2/2009 | Hamilton et al. ........... 455/414.2 |
| 2009/0094559 A1* | 4/2009 | Shoshan ........................ 715/853 |
| 2009/0165022 A1* | 6/2009 | Madsen et al. ................ 719/318 |
| 2009/0248738 A1* | 10/2009 | Martinez et al. .......... 707/103 R |
| 2009/0254538 A1* | 10/2009 | Arthurs et al. .................... 707/5 |
| 2009/0265106 A1* | 10/2009 | Bearman et al. ............. 701/300 |
| 2009/0319288 A1* | 12/2009 | Slaney et al. ...................... 705/1 |
| 2009/0327415 A1* | 12/2009 | Alberth et al. ................ 709/204 |
| 2009/0327484 A1* | 12/2009 | Chen et al. .................... 709/224 |
| 2009/0327501 A1* | 12/2009 | Athsani et al. ................ 709/229 |
| 2009/0328087 A1* | 12/2009 | Higgins et al. ................... 725/10 |
| 2010/0077484 A1* | 3/2010 | Paretti et al. .................... 726/26 |
| 2010/0088246 A1* | 4/2010 | Lim ................................ 705/319 |
| 2010/0120401 A1* | 5/2010 | Mears ........................ 455/414.1 |
| 2010/0144331 A1* | 6/2010 | Koberg et al. ................ 455/418 |
| 2010/0153465 A1* | 6/2010 | Dasgupta ...................... 707/802 |
| 2010/0161600 A1* | 6/2010 | Higgins et al. ................ 707/736 |
| 2010/0177938 A1* | 7/2010 | Martinez et al. .............. 382/118 |
| 2010/0179756 A1* | 7/2010 | Higgins et al. ............... 701/210 |
| 2010/0179856 A1* | 7/2010 | Paretti et al. .................... 705/10 |
| 2010/0179874 A1* | 7/2010 | Higgins et al. ............. 705/14.53 |
| 2011/0007882 A1* | 1/2011 | Renero Quintero et al. ......................... 379/90.01 |
| 2011/0319058 A1* | 12/2011 | Ankolekar et al. ......... 455/414.1 |

* cited by examiner

*Primary Examiner* — William Bashore
*Assistant Examiner* — Hien Duong
(74) *Attorney, Agent, or Firm* — Hartman & Citrin LLC

(57) ABSTRACT

Information is gathered regarding a first party. Social relationships between the first party and other parties are determined by transforming the gathered information into the social relationships. Relationship types of the social relationships between the first party and the other parties are determined by transforming the gathered information into the relationship types. Relationship strengths of the social relationships between the first and the other parties are determined by transforming the gathered information into the relationship strengths. The social utility grid is generated based on the social relationships between the first party and the other parties, the relationship types of the social relationships, and the relationship strengths of the social relationships.

17 Claims, 6 Drawing Sheets

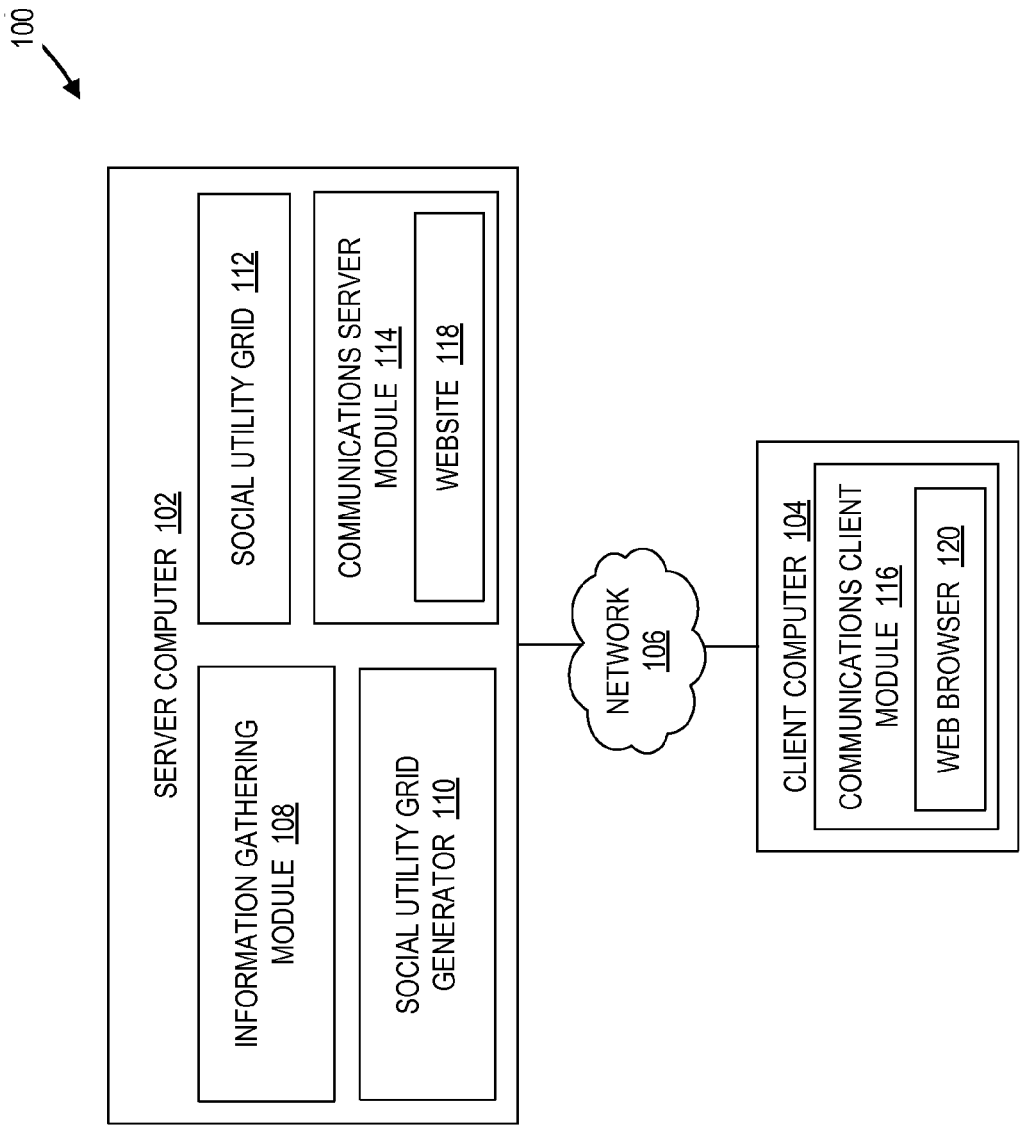

GENERATION AND IMPLEMENTATION OF A SOCIAL UTILITY GRID

BACKGROUND

This application relates generally to the field of social networks. More specifically, the disclosure provided herein relates to creating a social utility grid identifying relationships and providing social network services based on the social utility grid.

Social networking websites, such as FACEBOOK, LINKEDIN, and MYSPACE, enable users to identify, connect with, and communicate with friends. For example, at the outset, a first user and a second user may not be connected within a social network. The first user may connect with the second user by transmitting a friend invitation to the second user. The second user may accept or deny the friend invitation. If the second user denies the friend invitation, then the first user and the second user may remain unconnected within the social network. If the second user accepts the friend invitation, then the first user and the second user may be connected within the social network.

A given social network may include any number of users. In conventional social networking websites, the relationship between any two users in the social network is a binary representation. For example, the binary representation may indicate that two users are either friends or non-friends. In some implementations, certain permissions may be granted based on the binary relationship. For example, when the first user and the second user are not connected, the second user may be restricted from viewing the first user's profile. At a later time when the first user and the second user connect, the second user may be allowed to view the first user's profile.

Although social networking websites traditionally simplify relationships as a binary representation, real-life relationships have much greater variability. For example, a given individual may divide real-life relationships between co-workers, close friends, family members, and numerous others. However, many current implementations of social networks do not support richer representations of relationships beyond the traditional binary relationship.

SUMMARY

Embodiments of the disclosure presented herein include methods, systems, and computer-readable media for generating a social utility grid. According to one aspect, a method for generating a social utility grid is provided. According to the method, information is gathered regarding a first party. Social relationships between the first party and other parties are determined by transforming the gathered information into the social relationships. Relationship types of the social relationships between the first party and the other parties are determined by transforming the gathered information into the relationship types. Relationship strengths of the social relationships between the first and the other parties are determined by transforming the gathered information into the relationship strengths. The social utility grid is generated based on the social relationships between the first party and the other parties, the relationship types of the social relationships, and the relationship strengths of the social relationships.

According to another aspect, a system for generating a social utility grid is provided. The system includes a memory and a processor functionally coupled to the memory. The memory stores a program containing code for generating a social utility grid. The processor is responsive to computer-executable instructions contained in the program and configured to perform the following operations. Information is gathered regarding a first party. Social relationships between the first party and other parties are determined by transforming the gathered information into the social relationships. Relationship types of the social relationships between the first party and the other parties are determined by transforming the gathered information into the relationship types. Relationship strengths of the social relationships between the first and the other parties are determined by transforming the gathered information into the relationship strengths. The social utility grid is generated based on the social relationships between the first party and the other parties, the relationship types of the social relationships, and the relationship strengths of the social relationships.

According to yet another aspect, a computer-readable medium having instructions stored thereon for execution by a processor to perform a method for generating a social utility grid is provided. According to the method, information is gathered regarding a first party. Social relationships between the first party and other parties are determined by transforming the gathered information into the social relationships. Relationship types of the social relationships between the first party and the other parties are determined by transforming the gathered information into the relationship types. Relationship strengths of the social relationships between the first and the other parties are determined by transforming the gathered information into the relationship strengths. The social utility grid is generated based on the social relationships between the first party and the other parties, the relationship types of the social relationships, and the relationship strengths of the social relationships.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 1A is a simplified diagram illustrating a network architecture configured to generate and implement a social utility grid, in accordance with some embodiments.

DETAILED DESCRIPTION

Figure 1B:
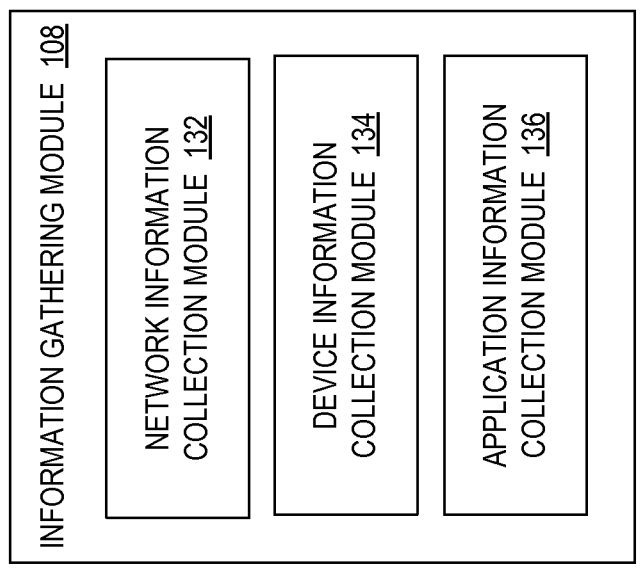
FIG. 1B is a simplified diagram illustrating additional details regarding an exemplary information gathering module, in accordance with some embodiments.

The following detailed description is directed to methods, systems, and computer-readable media for generating and implementing a social utility grid. As used herein, a social utility grid is a suitable data structure that specifies relationships between individual users, groups of users, and/or organizations. The social utility grid may be automatically generated by analyzing various information sources from which relationships can be inferred. That is, the social utility grid may model the relationships without any or with limited human interaction. When the social utility grid is generated, communications and information access may be automatically customized based on the relationships specified by the social utility grid.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for providing social network services will be described. In particular, FIG. 1A illustrates a simplified network architecture 100 configured to generate and implement a social utility grid according to some embodiments. The network architecture 100 includes a server computer 102 and client computer 104 coupled via a network 106. The server computer 102 includes an information gathering module 108, a social utility grid generator 110, a social utility grid 112, and a communications server module 114. The client computer 104 includes a communications client module 116, which is configured to communicate with the communications server module 114 via the network 106, such as a local area network ("LAN") or the Internet.

According to embodiments, the information gathering module 108 is configured to gather relationship information from a variety of sources. In particular, the relationship information may include any measurable information from which a relationship between two or more clients can be identified explicitly and/or inferred. As used herein, a client may refer to a single user, a group of users, or an organization. For example, the relationship information may include communications logs, such as call logs, call detail records ("CDR"), email logs, text message logs, instant message logs, web server logs, mobile network tower logs, device mobile tower logs, device WIFI access point ("AP") logs, device global positioning system ("GPS") logs, device BLUETOOTH logs, and the like. The communications logs may establish a relationship between the parties involved in the communications. Other examples of relationship information may include, but are not limited to, credit card transactions, monthly statements (e.g., bills), address books, calendars, photos, videos, email messages, a blog posting, GPS breadcrumb trails, and the like. The relationship information may be gathered as needed "on the fly" or retrieved from a data store. Additional details regarding the information gathering module 108 are described in greater detail below with respect to FIG. 1B.

In some embodiments, a user may reject relationships that are automatically identified or inferred by the information gathering module 108. For example, communication logs may indicate frequent communications between a user and a utility company by way of phone calls, emails, and the like. As a result, the information gathering module 108 may incorrectly infer a strong positive relationship between the user and the utility company based on the frequent communications. In this example, the user may reject or re-characterize the automatically identified or inferred relationship to the utility company.

Figure 2:
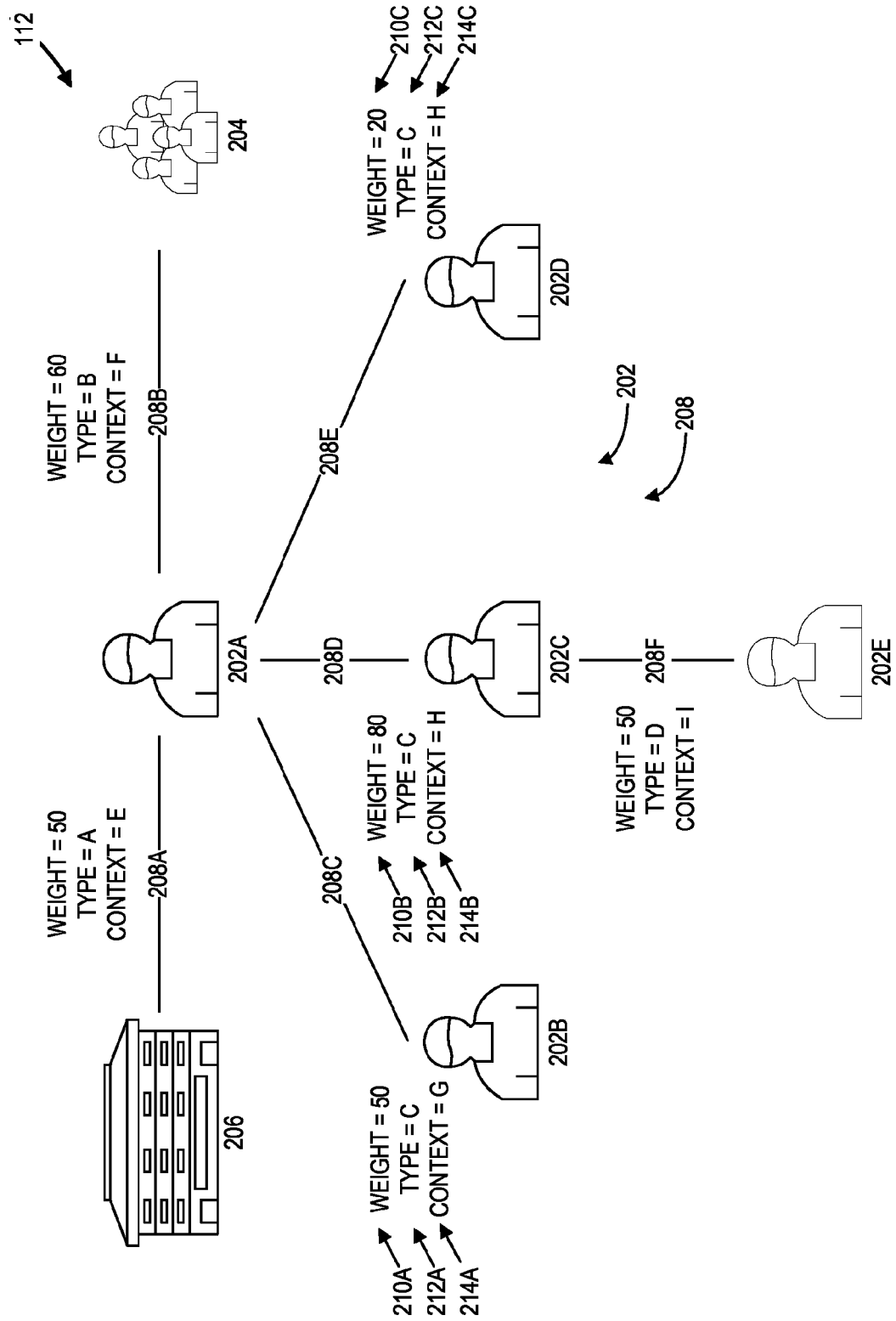
FIG. 2 is a diagram illustrating a graphical representation of an exemplary social utility grid, in accordance with some embodiments.

According to embodiments, the social utility grid generator 110 is configured to generate the social utility grid 112 based on the relationship information gathered by the information gathering module 108. In some embodiments, the social utility grid 112 may be embodied as a graph in which nodes represent clients and edges connecting the nodes represent a relationship between the corresponding nodes. In further embodiments, the edges may also be weighted in order to represent varying levels of relationships (e.g., a distant friend, a closer friend, etc.) between the clients. This weight may be referred to herein as "relationship strength." The relationship strength may be represented numerically within a range (e.g., 1 to 100 where 1 represents the lowest relationship strength and 100 represents the highest relationship strength). In even further embodiments, the edges may also identify the kind of relationship (e.g., friend, co-worker, family, church friend, parent of child's friend, supervisor, subordinate, priest, congregant, vendor, supplier, customer, partner, etc.) between the clients. This kind of relationship may be referred to herein as "relationship type." In further embodiments, the edges may also identify the relationship context (e.g., church building committee, Monday night bowling league, English Literature 101 class, parent-teacher association ("PTA"), photography club, Fred's 2009 birthday bash party, etc.) between the clients. An example of the social utility grid 112 is illustrated in FIG. 2 and is described in greater detail below.

The social utility grid generator 110 may identify and/or infer relationships for the social utility grid 112 by analyzing the gathered relationship information. In particular, the social utility grid generator 110 may identify and/or infer various criteria indicating a particular relationship. Criteria may refer to any measureable characteristics related to the relationship. These criteria may indicate (1) that a relationship between two or more clients exists, (2) the relationship strength of the relationship, (3) the relationship type, and/or (4) the relationship context. The social utility grid generator 110 may then aggregate multiple criteria to identify and/or infer the relationships and generate the social utility grid 112. In a mathematical context, the relationship strength and the relationship type may be represented as dimensions, and the relationship strength may represent values to those dimensions.

In a first example of criteria, communications made during business hours may indicate a co-worker relationship, while a communications made during evening hours may indicate a personal relationship, such as family or friends. In a second example, emails between work email addresses and phone calls between work telephone numbers may indicate a co-worker relationship, while emails between personal email addresses and phone calls between personal telephone numbers may indicate a personal relationship. In a third example, emails and telephone calls may indicate a business relationship, while text messages and instant messages may indicate a personal relationship. In a fourth example, a higher frequency and duration of calls may indicate a closer relationship, while a lower frequency and duration of calls may indicate a more distant relationship. In a fifth example, categories in an address book under which contacts are organized may indicate the kinds of relationships with respect to the contacts. In a sixth example, a party calendar invitation sent to multiple recipients may be combined with pictures taken at the party. The pictures may be analyzed to determine the invited recipients who attended the party. Party attendance may indicate relationships between the invited recipients, and the party itself may provide relationship strength, relationship context, and relationship type. In a seventh example, address book entries may be correlated with location information (e.g., via a global positioning system ("GPS") device or other suitable means) to determine proximity frequency and duration. Proximity frequency and duration can be a measure of relationship strength. When combined with additional information, proximity frequency and duration may be used to assess relationship type and relationship context. It should be appreciated that the aforementioned examples of criteria are merely illustrative and are not intended to be limiting. Other criteria from a variety of other information sources may be similarly retrieved and utilized as contemplated by those skilled in the art.

In some embodiments, the communications server module 114 is configured to host a website 118, and the communications client module 116 is configured to access the website 118 via the network 106. In this case, the communications client module 116 may include a web browser 120. For example, the website 118 may be a social networking website. The communications server module 114 may customize communications and/or limit access to certain content on the website 118 based on the relationships specified by the social utility grid 112. In particular, the communications server module 114 may customize communications on the website 118 based on (1) the identification of a relationship between two or more clients, (2) the relationship strength of the relationship, (3) the relationship type, and/or (4) the relationship context.

In a first example of an implementation of the social utility grid 112, a user may limit instant messages from only close friends with a minimum relationship strength. In a second example, a user may limit access to certain pictures to only family and closer friends (i.e., relationship strength and relationship type). In a third example, a user may limit family to view only a portion of the user's calendar related to personal activities and limit co-workers to view only a portion of the user's calendar related to work activities (i.e., relationship type). In a fourth example, a user may schedule a church function on the calendar at a given date and time. The user may limit other church members to access the user's location (e.g., via the user's cellular device) only around the given date and time of the church function (i.e., relationship context). In a fifth example, a user may limit access to a telephone number or other profile information to only first and second order friends. In a sixth example, a user may reject all email addressed to a personal email account when the sender's relationship strength, relationship type, and/or relationship context is insufficient to allow emails to pass through. It should be appreciated that the aforementioned examples of customizations are merely illustrative and are not intended to be limiting. Other customizations may be similarly utilized as contemplated by those skilled in the art.

It should further be appreciated that the website 118, such as a social networking website, is merely an illustrative application of the social utility grid 112. Other applications of the social utility grid 112 may be contemplated by those skilled in the art. In particular, any communications modality utilizing customizations to permit and/or restrict access may implement the social utility grid 112. Examples of such communications modalities include, but are not limited to, telephone calls, emails, text messages, and instant messaging. Further, the social utility grid 112 may be implemented to control access to information and functionality provided by the website 118 and other suitable applications.

Referring now to FIG. 1B, additional details regarding the information gathering module 108 from FIG. 1A is shown, in accordance with some embodiments. As illustrated in FIG. 1B, the information gathering module 108 includes a network information collection module 132, a device information collection module 134, and an application information collection module 136. The network information collection module 132 may be configured to collect relationship information from network-based sources, such as CDR, deep packet inspection ("DPI"), web usage tracking systems, and the like. The network information collection module 132 may collect relationship information from landline telephone carriers, mobile cellular carriers, broadband network providers, Internet access providers, Internet service providers, Internet websites, and/or the like.

The device information collection module 134 may be configured to collect device-based relationship information from processor-based devices, such as computers, mobile devices, and the like, coupled to the network 106. Although the device information collection module 134 is shown as being embodied on the server computer 102, at least part of the device information collection module 134 may be implemented within the device itself. The decision as to whether to implement at least part of the device information collection module 134 within the device may depend on design tradeoffs between privacy, battery life, completeness, and complexity.

The application information collection module 136 may be configured to collect relationship information from software applications. These software applications may be executed in a cloud-based computing environment and/or as a traditional client-side application. Examples of software applications may include address book applications, calendar applications, photo applications, video applications, email applications, and the like. In some embodiments, the application information collection module 136 may collect relationship information from storage devices utilized by the software applications to store application-related data.

Referring now to FIG. 2, an illustrative example of the social utility grid 112 is shown. In some embodiments, the social utility grid 112 is a graph including a plurality of nodes connected by a plurality of edges. The nodes may specify the clients, while the edges may specify relationships between the clients.

As illustrated in FIG. 2, the nodes in the social utility grid 112 include users 202A, 202B, 202C, 202D, 202E, a group of users 204, and an organization 206. The first user 202A is connected to the organization 206 as indicated by a first edge 208A and the group of users 204 as indicated by a second edge 208B. The first user 202A is further connected to a second user 202B, a third user 202C, and a fourth user 202D as indicated by a third edge 208C, a fourth edge 208D, and a fifth edge 208E, respectively. The third user 202C is also connected to a fifth user 202E as indicated by a sixth edge 208F. The users 202A, 202B, 202C, 202D, 202E may be collectively referred to as users 202. The edges 208A, 208B, 208C, 20D, 208E, 208F may be collectively referred to as edges 208.

According to some embodiments, each of the edges 208 is associated with a weight, a type, and a context. For example, the third edge 208C is associated with a first weight 210A, a first type 212A, and a first context 214A, and the fourth edge 208D is associated with a second weight 210B, a second type 212B, and a second context 214B. Further, the fifth edge 208E is associated with a third weight 210C, a third type 212C, and a third context 214C. In the example illustrated in FIG. 2, the weight refers to a number between 1 and 100 specifying relationship strength between the users connected by the corresponding edges 208. The type refers to a relationship type specifying the type of relationship between the users connected by the corresponding edges 208. For the sake of illustration, the relationship types are represented by a letter A, B, C, or D in FIG. 2. The context refers to a relationship context specifying the context of the relationship between the users connected by the corresponding edges 208. For the sake of illustration, the relationship contexts are represented by a letter E, F, G, H, or I in FIG. 2.

As previously described, the first user 202A is connected to the second user 202B, the third user 202C, and the fourth user 202D. According to the types 212A, 212B, 212C, the relationship type between the first user 202A and each of the users 202B, 202C, 202D are the same. For example, the users 202B, 202C, 202D may each be co-workers with the first user 202A. According to the contexts 214A, 214B, 214C, the first user 202A has a relationship context, G, with the second user 202B and a relationship context, H, with the users 202C, 202D. For example, the first user 202A may have previously worked with the second user 202B in an old internship, while the first user 202A now works with the users 202C, 202D in a current position. According to the weights 210A, 210B, 210C, the first user 202A may have a stronger relationship with the third user 202C than with the second user 202B and a stronger relationship with the second user 202B than with the fourth user 202D.

According to embodiments, relationships may be identified by order, which refers to the closeness between parties (i.e., how closely the parties are related). In particular, relationships may be referred to by first order, second order, third order, and so forth. The first order refers to direct relationships between two parties. For example, the first user 202A and the third user 202C have a first order relationship. The second order refers to indirect relationships in which a first party is connected to a second party through a third party. That is, no direct connection exists between the first party and the second party. For example, the first user 202A and the fifth user 202E have a second order relationship because the first user 202A is connected to the fifth user 202E only through the third user 202C. Higher order relationships involve indirect relationships in which additional parties connect a first party and a second party (e.g., a third order relationship involves two parties connected the first party and the second party, a fourth order relationship involves three parties connecting the first party and the second party, etc.).

Figure 3:
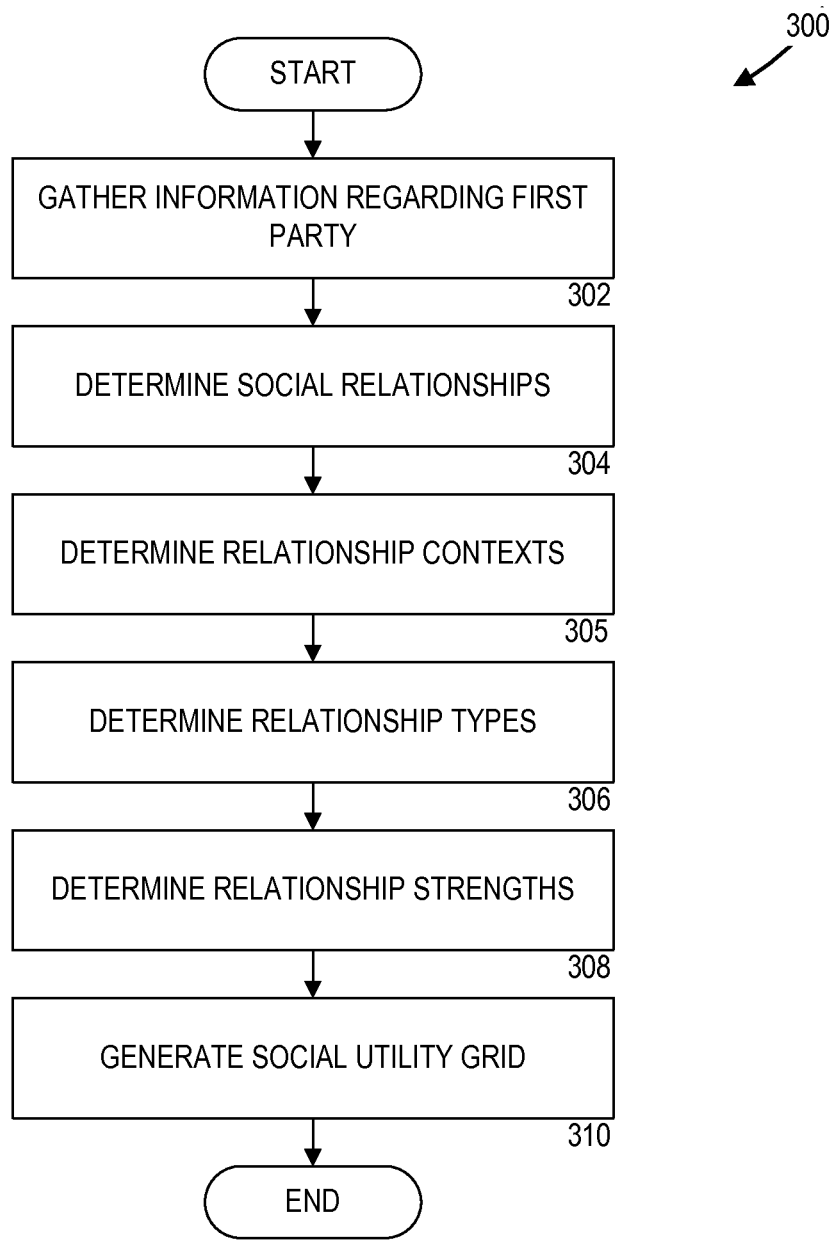
FIG. 3 is a flow diagram illustrating an exemplary method for generating a social utility grid, in accordance with some embodiments.
Figure 4:
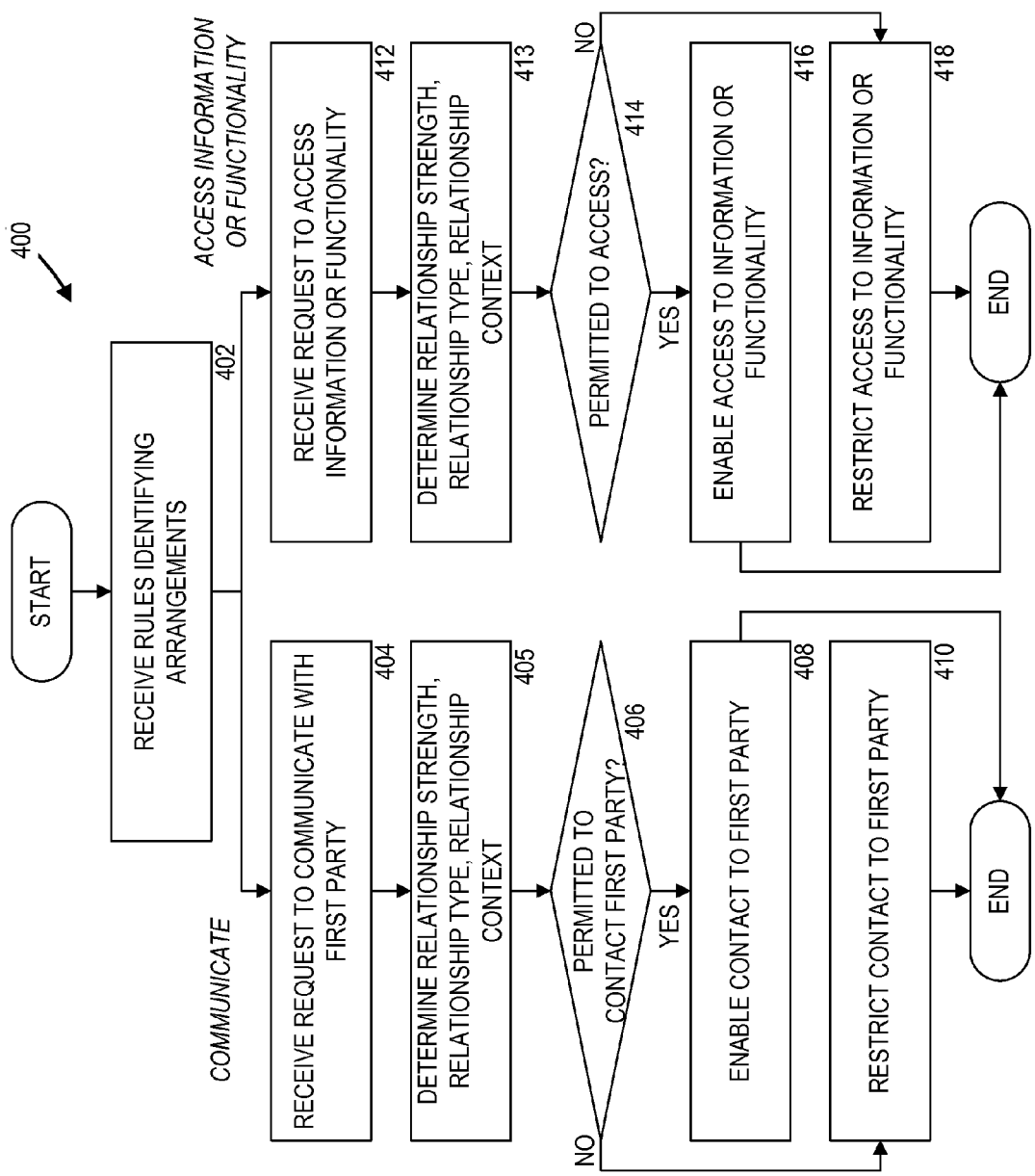
FIG. 4 is a flow diagram illustrating an examplary method for implementing a social utility grid, in accordance with some embodiments.

Referring now to FIGS. 3 and 4, additional details will be provided regarding some embodiments described herein for generating and implementing the social utility grid 112. In particular, FIG. 3 is a flow diagram illustrating an examplary method for generating the social utility grid 112, in accordance with some embodiments. FIG. 4 is a flow diagram illustrating an examplary method for implementing the social utility grid 112, in accordance with some embodiments.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 3, a method 300 begins at operation 302, where the information gathering module 108 gathers information regarding a first party. In particular, the information gathering module 108 may gather any information with which social relationships between the first party and other parties can be identified and/or inferred. According to some embodiments, the information gathered by the information gathering module 108 is provided to the social utility grid generator 110. When the information gathering module 108 gathers the information regarding the first party, the method 300 proceeds to operations 304, 305, 306, 308.

At operations 304, 305, 306, 308, the social utility grid generator 110 determines various data that are used to populate the social utility grid 112. At operation 304, the social utility grid generator 110 determines social relationships between the first and other parties. At operation 305, the social utility grid generator 110 determines relationship contexts of the social relationships between the first and other parties. At operation 306, the social utility grid generator 110 determines relationship types of the social relationships between the first and other parties. At operation 308, the social utility grid generator 110 determines relationship strengths of the social relationships between the first and other parties.

The social utility grid generator 110 may transform the information gathered by the information gathering module 108 into the social relationships, the relationship contexts of the social relationships, the relationship types of the social relationships, and the relationships strengths of the social relationships between the first party and other parties. In particular, the social utility grid generator 110 may identify and/or infer the social relationships, the relationship contexts of the social relationships, the relationship types of the social relationships, and the relationships strengths of the social relationships between the first party and other parties based on the information gathered by the information gathering module. When the social utility grid generator 110 determines the social relationships, the relationship contexts of the social relationships, the relationship types of the social relationships, and the relationships strengths of the social relationships between the first party and other parties, the method 300 proceeds to operation 310, where the social utility grid generator 110 generates the social utility grid 112 based on the social relationships, the relationship contexts, the relationship types of the social relationships, and the relationships strengths of the social relationships between the first party and other parties.

Referring now to FIG. 4, a method 400 begins at operation 402, where the communications server module 114 receives rules identifying arrangements of the social relationships, as well as the relationship contexts, the relationship types, and the relationships strengths of the social relationships between two or more parties. In some embodiments, these rules may include communication rules permitting, denying, or otherwise controlling communications between the two or more parties. For example, the communication rules may include rules specifying whether certain parties can contact a first party through various communication means, such as phone calls, instant messages, text messages, and the like. In further embodiments, these rules may include access rules permitting, denying, or otherwise controlling access to certain information or functionality associated with a first party by other parties. If the rules include communication rules, the method 400 proceeds to operations 404, 405, 406, 408, 410. If the rules include access rules, the method 400 proceeds to operations 412, 413, 414, 416, 418.

At operation 404, the communications server module 114 receives a request from a requesting party to communicate with a first party. For example, the requesting party may attempt to initiate a communication, such as a message or an instant message through the website 118, to the first party. When the communications server module 114 receives the request from the requesting party to communicate with the first party, the method 400 proceeds to operation 405, where the communications server module 114 determines in real-time or near real-time the relationship strength, the relationship context, and/or the relationship type between the requesting party and the first party. The communications server module 114 may determine the relationship strength, the relationship context, and/or the relationship type based on the type of request and various available information, such as calendar items and location information (e.g., proximity). For example, the first party and the requesting party may belong to a church group that is sponsoring an event at a remote location. In this example, the first party may be very familiar with the remote location of the event. As such, the first party may grant members of the church group, including the requesting party, the ability to contact the first party based on personal calendar items and/or proximity information. In particular, the personal calendar items may be utilized to grant access to church members to contact the first party near the day and time of the event. Additionally or in the alternative, the proximity information may be utilized to grant access to people to contact the first party when those people are physically near the first party. The method 400 then proceeds to operation 406, where the communications server module 114 determines whether the requesting party is permitted to contact the first party based on the communication rules and the social utility grid 112. The communications server module 114 may also determine whether the requesting party is permitted to contact the first party based further on the real-time or near real-time determination of the relationship strength, the relationship context, and/or the relationship type between the requesting party and the first party.

As previously described, the social utility grid 112 may also specify the social relationships, the relationship contexts, the relationship types of the social relationships, and the relationships strengths of the social relationships between the first party and other parties. Thus, by mapping the communication rules to the social utility grid 112, the communications server module 114 can determine whether the requesting party is permitted to contact the first party. For example, the communication rules may specify that only co-workers with a minimum relationship strength of 50 can contact, such as send private messages to, the first party. In this example, the communications server module 114 may analyze the social utility grid 112 to determine (a) whether the requesting party is a co-worker, and if so, (b) whether the requesting party has a relationship strength greater than 50.

If the communications server module 114 determines that the requesting party is permitted to contact the first party, then the method 400 proceeds to operation 408. At operation 408, the communications server module 114 enables the requested communication by the requesting party to the first party. If the communications server module 114 determines that the requesting party is not permitted to contact the first party, then the method 400 proceeds to operation 410. At operation 410, the communications server module 114 restricts the requested communication by the requesting party to the first party.

At operation 412, the communications server module 114 receives a request from a requesting party to access information or functionality associated with the first party. In one example, the requesting party may attempt to view a photo album controlled by the first party. In another example, the requesting party may attempt to post a public bulletin board on the first party's web page. When the communications server module 114 receives the request from the requesting party to access information or functionality associated with the first party, the method 400 proceeds to operation 414, where the communications server module 114 determines whether the requesting party is permitted to access the information or functionality associated with the first party based on the access rules and the social utility grid 112.

By mapping the communication rules to the social utility grid 112, the communications server module 114 can determine whether the requesting party is permitted to access the information or functionality associated with the first party. For example, the access rules may specify that only family members with a minimum relationship strength of 60 can view the photo album controlled by the first party. In this example, the communications server module 114 may analyze the social utility grid 112 to determine (a) whether the requesting party is a family member, and if so, (b) whether the requesting party has a relationship strength greater than 60.

If the communications server module 114 determines that the requesting party is permitted to access the information or functionality associated with the first party, then the method 400 proceeds to operation 416. At operation 416, the communications server module 114 enables the requesting party to access the information or functionality associated with the first party. If the communications server module 114 determines that the requesting party is not permitted to access the information or functionality associated with the first party, then the method 400 proceeds to operation 418. At operation 418, the communications server module 114 restricts the requested communication to access the information or functionality associated with the first party.

Figure 5:
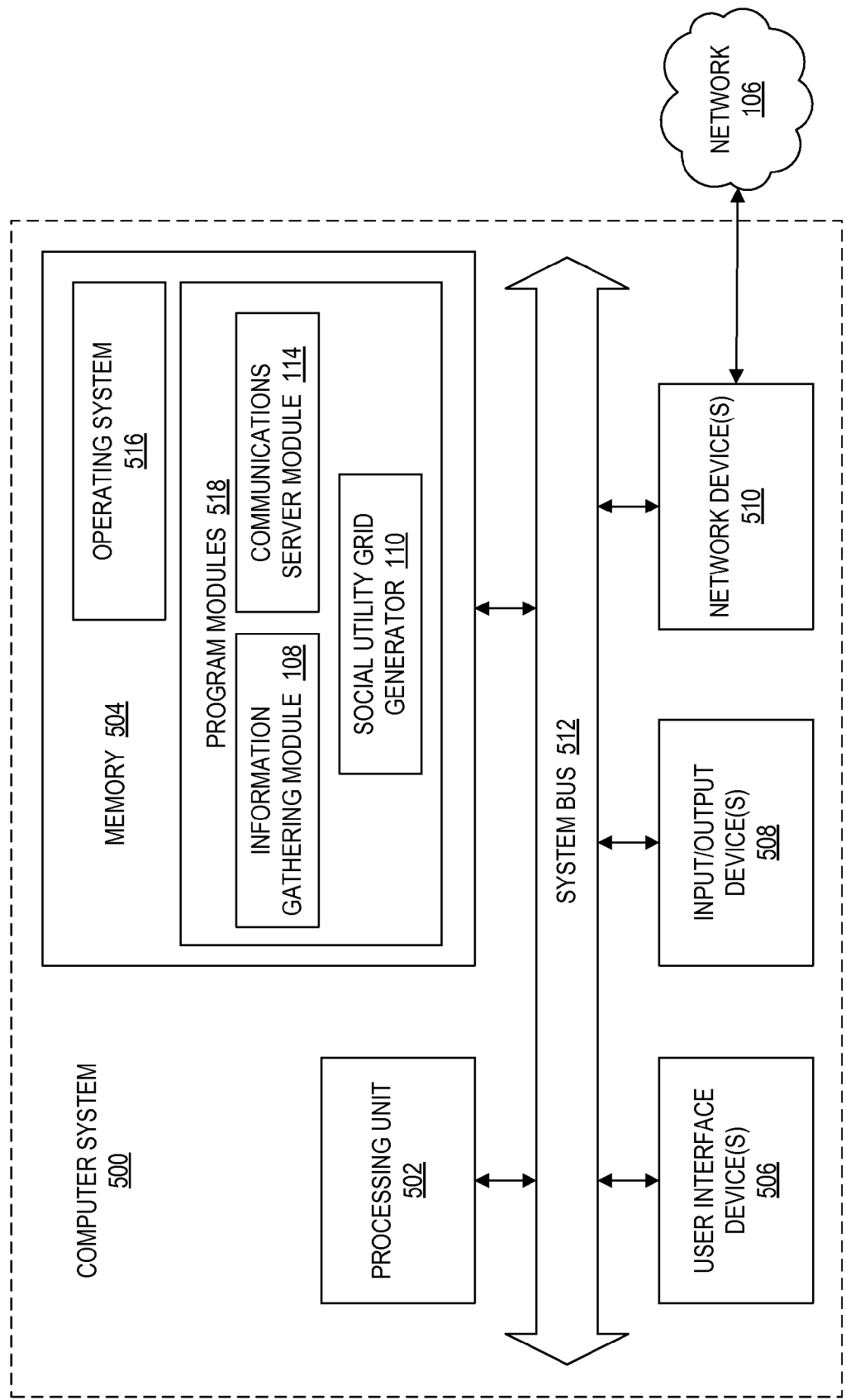
FIG. 5 is a block diagram illustrating an exemplary system configured to generate and implement a social utility grid, in accordance with some embodiments.

FIG. 5 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 5 is a block diagram illustrating a computer system 500 configured to generate and implement the social utility grid 112, in accordance with embodiments. Examples of the computer system 500 may include the server computer 102 and the client computer 104. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 504 communicates with the processing unit 502 via the system bus 512. In one embodiment, the memory 504 is operatively connected to a memory controller (not shown) that enables communication with the processing unit 502 via the system bus 512. The memory 504 includes an operating system 516 and one or more program modules 518, according to exemplary embodiments. Examples of operating systems, such as the operating system 516, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. Examples of the program modules 518 include the information gathering module 108, the social utility grid generator 110, the communications server module 114, and the communications client module 116. In some embodiments, the program modules 518 are embodied in computer-readable media containing instructions that, when executed by the processing unit 502, performs the method 300 for generating the social utility grid 112, as described in greater detail above with respect to FIG. 3. In further embodiments, the program modules 518 are embodied in computer-readable media containing instructions that, when executed by the processing unit 502, performs the method 400 for implementing the social utility grid 112, as described in greater detail above with respect to FIG. 4. According to embodiments, the program modules 518 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 518. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via the network 106. Examples of the network devices 510 may include, but are not limited to, a modem, a radio frequency ("RF") or infrared ("IR") transceiver, a telephonic interface, a bridge, a router, or a network card. The network 106 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 106 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for generating a social utility grid, the method comprising:
    gathering, by a computer comprising a processor, information regarding a first party, wherein the information comprises location information associated with the first party;
    determining, by the computer based on the information, a social relationship between the first party and a second party;
    determining, by the computer based on the information, a relationship type of the social relationship between the first party and the second party;
    correlating, by the computer, an address book entry associated with the second party with the location information associated with the first party to determine a proximity frequency between the first party and the second party;
    determining, by the computer based at least in part on the proximity frequency between the first party and the second party, a relationship strength of the social relationship between the first party and the second party;
    generating, by the computer, the social utility grid, the social utility grid identifying the social relationship, the relationship type of the social relationship, and the relationship strength of the social relationship;

receiving, by the computer, a first communication rule identifying a date when a party associated with a first type of relationship is allowed to contact the first party and identifying a proximity to the first party required by the party associated with the first type of relationship to contact the first party;

receiving, by the computer, a first request from the second party to contact the first party;

determining, by the computer, whether a current date meets the date identified by the first communication rule, whether the second party is within the proximity to the first party identified by the first communication rule, and whether the relationship type of the social relationship between the first party and the second party meets the first type of relationship identified by the first communication rule; and in response to determining that the current date meets the date identified by the first communication rule, that the second party is within the proximity to the first party identified by the first communication rule, and that the relationship type of the social relationship between the first party and the second party meets the first type of relationship identified by the first communication rule, granting, by the computer, the first request from the second party to contact the first party.

2. The method of claim 1, further comprising:

determining, based on the information, a relationship context between the first party and the second party, wherein the relationship context identifies a group in which the first party and the second party belong; and generating, by the computer, the social utility grid that identifies the social relationship, the relationship context of the first party and the second party, the relationship type of the social relationship, and the relationship strength of the social relationship.

3. The method of claim 2, wherein the first party and the second party each comprises at least one of a person, a group of people, or an organization, wherein the social utility grid comprises a graph, the graph comprising a first node representing the first party, a second node representing the second party, and an edge connecting the first node and the second node, the edge representing the social relationship between the first party and the second party, and wherein the social utility grid further comprises representations of the relationship type, the relationship context, and a weight representing the relationship strength.

4. The method of claim 1, further comprising:

receiving a second communication rule identifying a second type of relationship and a strength of relationship required to contact the first party via a type of communication;

receiving, from the second party via the type of communication identified by the second communication rule, a second request to contact the first party;

determining whether the relationship type of the social relationship between the first party and the second party meets the second type of relationship identified by the second communication rule and whether the relationship strength of the social relationship between the first party and the second party meets the strength of relationship identified by the second communication rule; and in response to determining that the relationship type of the social relationship between the first party and the second party does not meet the second type of relationship identified by the second communication rule, restricting the second party from contacting the first party via the type of communication identified by the second communication rule.

5. The method of claim 4, wherein the type of communication identified by the second communication rule comprises at least one of a mobile communication, a text message, an instant message, or an email.

6. The method of claim 1, wherein determining, by the computer, the social relationship between the first party and the second party comprises inferring the social relationship based on the information, and wherein the location information is gathered from device global positioning system logs.

7. A system for generating a social utility grid, comprising:

a processor; and a memory that stores instructions for generating the social utility grid which, when executed by the processor, cause the processor to perform operations comprising gathering information regarding a first party, wherein the information comprises location information associated with the first party, determining, based on the information, a social relationship between the first party and a second party, determining, based on the information, a relationship type of the social relationship between the first party and the second party, correlating an address book entry associated with the second party with the location information associated with the first party to determine a proximity frequency between the first party and the second party, determining, based at least in party on the proximity frequency between the first party and the second party, a relationship strength of the social relationship between the first party and the second party, generating the social utility grid, the social utility grid identifying the social relationship, the relationship type of the social relationship, and the relationship strength of the social relationship, receiving a first communication rule identifying a date when a party associated with a first type of relationship is allowed to contact the first party and identifying a proximity to the first party required by the party associated with the first type of relationship to contact the first party, receiving a first request from the second party to contact the first party, determining whether a current date meets the date identified by the first communication rule, whether the second party is within the proximity to the first party identified by the first communication rule, and whether the relationship type of the social relationship between the first party and the second party meets the first type of relationship identified by the first communication rule, and in response to determining that the current date meets the date identified by the first communication rule, that the second party is within the proximity to the first party identified by the first communication rule, and that the relationship type of the social relationship between the first party and the second party meets the first type of relationship identified by the first communication rule, granting the request from the second party to contact the first party.

8. The system of claim 7, wherein the operations further comprises:

determining, based on the information, a relationship context between the first party and the second party, wherein the relationship context identifies a group in which the first party and the second party belong; and generating the social utility grid that identifies the social relationship, the relationship context of the first party and the second party, the relationship type of the social relationship, and the relationship strength of the social relationship.

9. The system of claim 8, wherein the first party and the second party each comprises at least one of a person, a group of people, or an organization,
wherein the social utility grid comprises a graph, the graph comprising a first node representing the first party, a second node representing the second party, and an edge connecting the first node and the second node, the edge representing the social relationship between the first party and the second party, and
wherein the social utility grid further comprises representations of the relationship type, the relationship context, and a weight representing the relationship strength.

10. The system of claim 7, wherein the operations further comprise:
receiving a second communication rule identifying a second type of relationship and a strength of relationship required to contact the first party via a type of communication;
receiving, from the second party via the type of communication identified by the second communication rule, a second request to contact the first party;
determining whether the relationship type of the social relationship between the first party and the second party meets the second type of relationship identified by the second communication rule and whether the relationship strength of the social relationship between the first party and the second party meets the strength of relationship identified by the second communication rule; and
in response to determining that the relationship type of the social relationship between the first party and the second party does not meet the second type of relationship identified by the second communication rule, restricting the second party from contacting the first party via the type of communication identified by the second communication rule.

11. The system of claim 10, wherein the type of communication identified by the second communication rule comprises a mobile communication, a text message, an instant message, or an email.

12. A non-transitory computer-readable medium having instructions stored thereon that, when executed by a processor, cause the processor to perform operations comprising:
gathering information regarding a first party, wherein the information comprises location information associated with the first party;
determining, based on the information, a social relationship between the first party and a second party;
determining, based on the information, a relationship type of the social relationship between the first party and the second party;
correlating an address book entry associated with the second party with the location information associated with the first party to determine a proximity frequency between the first party and the second party;
determining, based at least in part the proximity frequency between the first party and the second party, a relationship strength of the social relationship between the first party and the second party;
generating a social utility grid, the social utility grid identifying the social relationship, the relationship type of the social relationship, and the relationship strength of the social relationship;
receiving a first communication rule identifying a date when a party associated with a first type of relationship is allowed to contact the first party and identifying a proximity to the first party required by the party associated with the first type of relationship to contact the first party;
receiving a first request from the second party to contact the first party;
determining whether a current date meets the date identified by the first communication rule, whether the second party is within the proximity to the first party identified by the first communication rule, and whether the relationship type of the social relationship between the first party and the second party meets the first type of relationship identified by the first communication rule; and
in response to determining that the current date meets the date identified by the first communication rule, that the second party is within the proximity to the first party identified by the first communication rule, and that the relationship type of the social relationship between the first party and the second party meets the first type of relationship identified by the first communication rule, granting the first request from the second party to contact the first party.

13. The non-transitory computer-readable medium of claim 12, wherein the operations further comprise:
determining, based on the information, a relationship context between the first party and the second party, wherein the relationship context identifies a group in which the first party and the second party belong; and
generating the social utility grid that identifies the social relationship, the relationship context of the first party and the second party, the relationship type of the social relationship, and the relationship strength of the social relationship.

14. The non-transitory computer-readable medium of claim 13, wherein the first party and the second party each comprises at least one of a person, a group of people, or an organization,
wherein the social utility grid comprises a graph, the graph comprising a first node representing the first party, a second node representing the second party, and an edge connecting the first node and the second node the edge representing the social relationship between the first party and the second party, and
wherein the social utility grid further comprises representations of the relationship type and the relationship context and a weight representing the relationship strength.

15. The non-transitory computer-readable medium of claim 12, wherein the operations further comprise:
receiving a second communication rule identifying a second type of relationship and a strength of relationship required to contact the first party via a type of communication;
receiving, from the second party via the type of communication identified by the second communication rule, a second request to contact the first party;
determining whether the relationship type of the social relationship between the first party and the second party meets the second type of relationship identified by the second communication rule and whether the relationship strength of the social relationship between the first party and the second party meets the strength of relationship identified by the second communication rule; and in response to determining that the relationship type of the social relationship between the first party and the second party does not meet the second type of relationship identified by the second communication rule, restricting the second party from contacting the first party via the type of communication identified by the second communication rule.

16. The non-transitory computer-readable medium of claim 15, wherein the type of communication identified by the second communication rule comprises a mobile communication, a text message, an instant message, or an email.

17. The non-transitory computer-readable medium of claim 12, wherein determining the social relationship between the first party and the second party comprises inferring the social relationship based on the information, and wherein the location information is gathered from device global positioning system logs.

* * * * *